United States Patent
Fukuma et al.

(10) Patent No.: US 7,560,186 B2
(45) Date of Patent: Jul. 14, 2009

(54) EXHAUST GAS DISPOSAL APPARATUS OF FUEL CELL

(75) Inventors: Kazunori Fukuma, Saitama (JP); Takayuki Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 794 days.

(21) Appl. No.: 10/997,615

(22) Filed: Nov. 23, 2004

(65) Prior Publication Data

US 2005/0118471 A1 Jun. 2, 2005

(30) Foreign Application Priority Data

Nov. 27, 2003 (JP) ............. 2003-397190

(51) Int. Cl.
  *H01M 8/04* (2006.01)
  *H01M 8/00* (2006.01)
  *H01M 2/00* (2006.01)
(52) U.S. Cl. .................. 429/34; 429/12; 429/22
(58) Field of Classification Search ............ None
  See application file for complete search history.

(56) References Cited

U.S. PATENT DOCUMENTS

2002/0094469 A1* 7/2002 Yoshizumi et al. ........... 429/34
2003/0077488 A1* 4/2003 Yamamoto et al. ........... 429/17
2004/0072052 A1* 4/2004 Yamamoto et al. ........... 429/34

FOREIGN PATENT DOCUMENTS

JP 11-191422 7/1999
JP 2004055205 * 2/2004

OTHER PUBLICATIONS

Larminie, James; Dicks, Andrew; Fuel Cell Systems Explained; 2003; John Wiley & Sons; 2nd Editon; pp. 326-327.*
JPO IPDL machine translation of JP2004055205, published Feb. 19, 2004, retrieved Mar. 10, 2009.*

* cited by examiner

*Primary Examiner*—Dah-Wei D Yuan
*Assistant Examiner*—Katherine Turner
(74) *Attorney, Agent, or Firm*—Lahive & Cockfield, LLP; Anthony A. Laurentano

(57) ABSTRACT

An exhaust gas disposal apparatus of a fuel cell of the present invention is equipped with a dilution vessel having a staying chamber for staying a hydrogen gas purged from a fuel cell and exhaust piping for passing a cathode off-gas, wherein any of the dilution vessel and the exhaust piping is provided with a hydrogen suction hole for sucking the hydrogen gas within the staying chamber and an off-gas supply hole for supplying the cathode off-gas within the exhaust piping into the dilution vessel, and wherein a flow adjustment measure for flow-adjusting the hydrogen gas, leading it into the hydrogen suction hole, and suppressing diffusion of the cathode off-gas supplied into the staying chamber from the off-gas supply hole is provided.

11 Claims, 5 Drawing Sheets

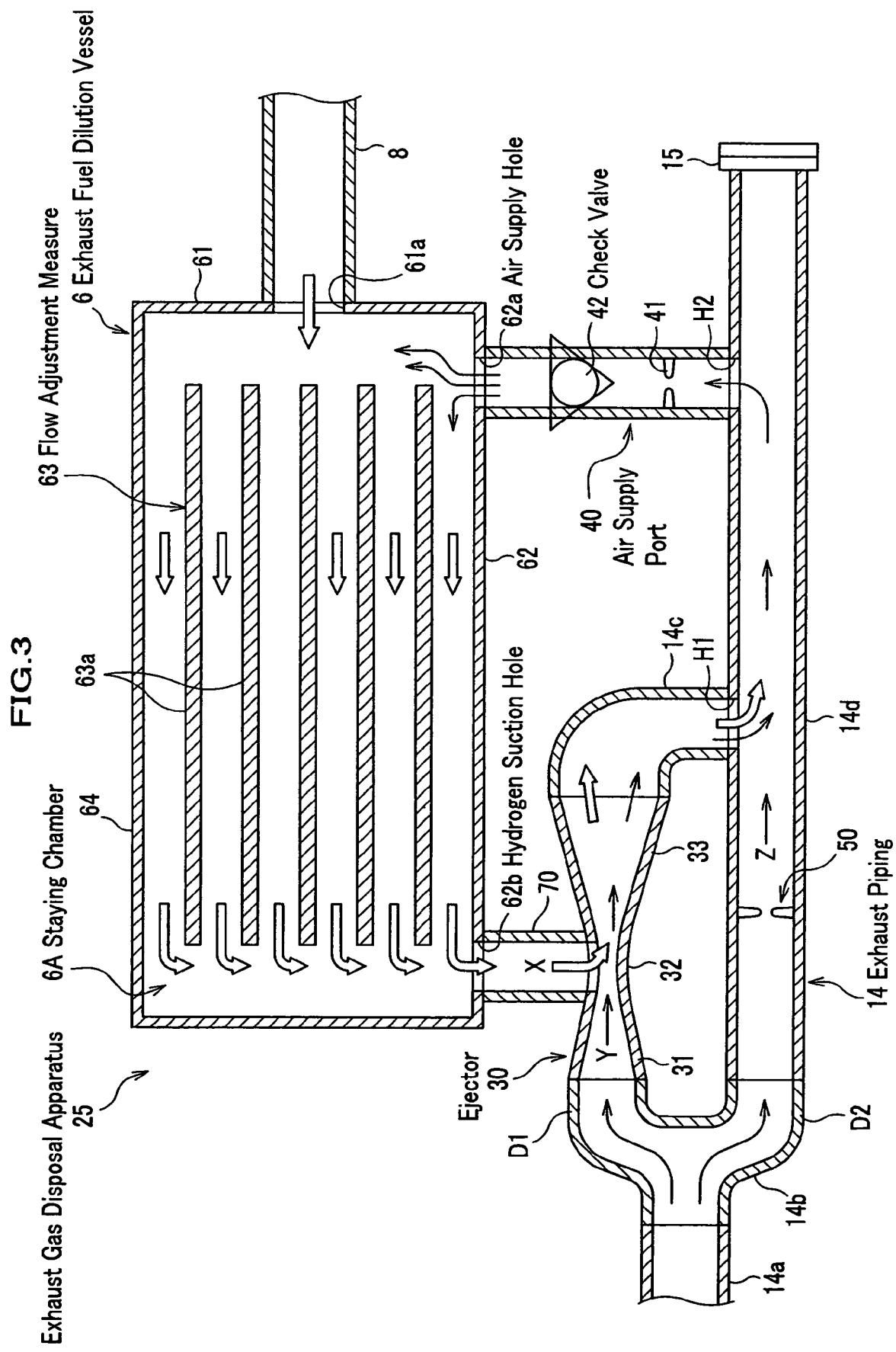

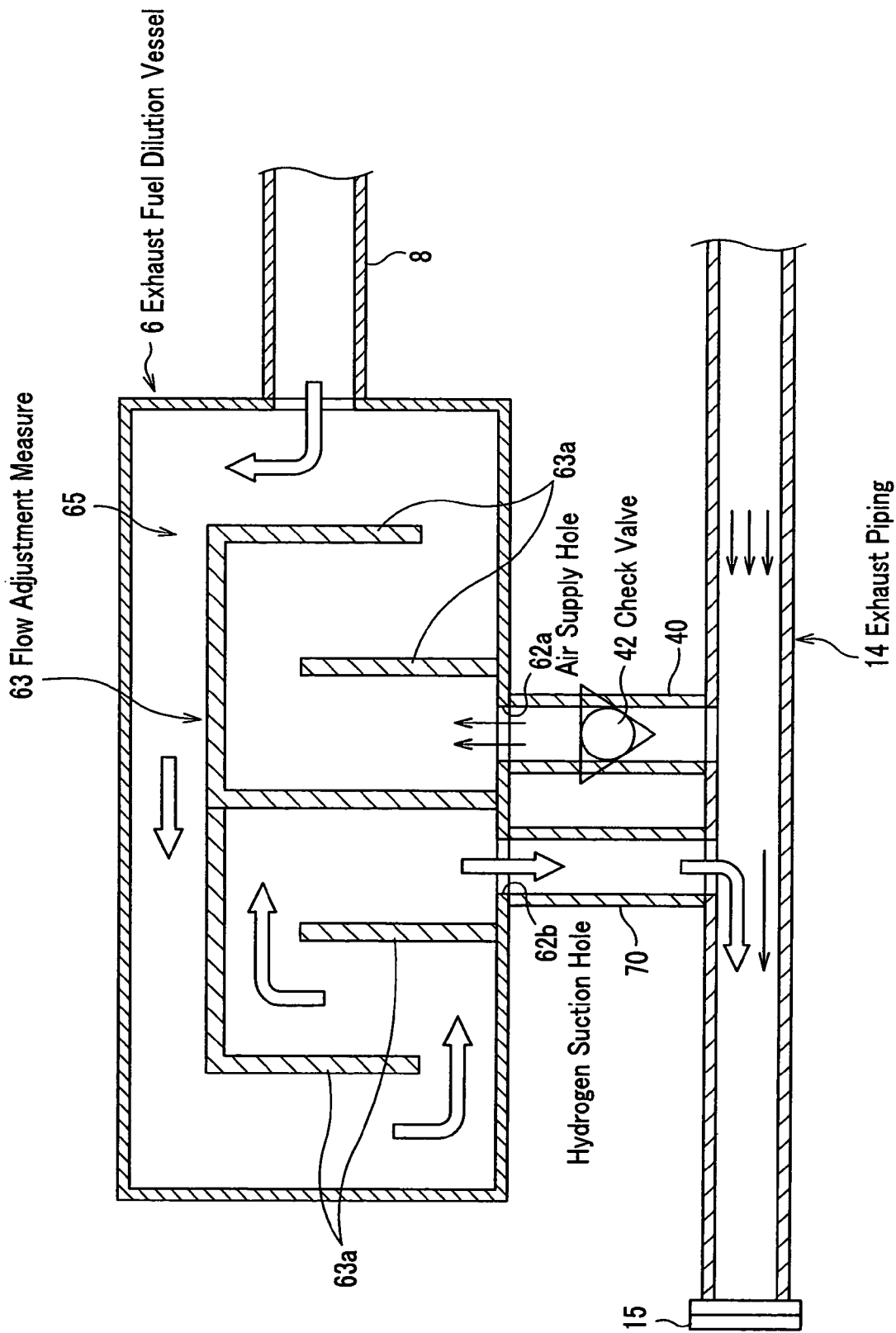

EXHAUST GAS DISPOSAL APPARATUS OF FUEL CELL

BACKGROUND OF THE INVENTION

1. Field of the Invention

The present invention relates to an exhaust gas disposal apparatus of a fuel cell that exhausts a hydrogen gas purged from the fuel cell after diluting it till a predetermined concentration.

2. Description of the Related Art

Generally, a fuel cell is configured by comparting a cathode at one side and an anode at the other side, sandwiching a proton-conductive polymer electrolyte membrane (PEM), and generates electricity by an electrochemical reaction between oxygen in the air supplied to the cathode and hydrogen in a fuel gas supplied to the anode. And in such the field of the fuel cell, as a technology for diluting and exhausting a non-reaction hydrogen gas into the atmosphere is known such a technology of mixing a hydrogen gas (purge hydrogen) exhausted from the fuel gas with the air within a dilution vessel, reducing a hydrogen concentration, and then exhausting it into the atmosphere (for example, see paragraph [0024] and FIG. 2 in Japanese Patent Laid-Open Publication Hei 11-191422).

In this connection, in such the technology it is desired to sufficiently draw out a capacity of the dilution vessel by making the hydrogen concentration in the exhaust gas approximately constant, in order to maintain the hydrogen concentration in the exhaust gas exhausted into the atmosphere from the dilution vessel not more than a predetermined limit value and to dilute the purge hydrogen as much as possible Consequently, it is strongly requested an exhaust gas disposal apparatus of a fuel cell that enables the capacity of the dilution vessel to be sufficiently drawn out.

SUMMARY OF THE INVENTION

A first aspect of the present invention for solving the problem described above is an exhaust gas disposal apparatus of a fuel cell that comprises a dilution vessel having a staying chamber for staying a hydrogen gas purged from a fuel cell and exhaust piping for passing a cathode off-gas, wherein any of the dilution vessel and the exhaust piping comprises a hydrogen suction hole for sucking the hydrogen gas within the staying chamber and an off-gas supply hole for supplying the cathode off-gas within the exhaust piping into the dilution vessel, and wherein a flow adjustment measure for flow-adjusting the hydrogen gas, leading the hydrogen gas into the hydrogen suction hole, and suppressing diffusion of the cathode off-gas supplied into the staying chamber from the off-gas supply hole is provided.

In accordance with the first aspect of the present invention, when the hydrogen gas is purged from the fuel cell, the gas flows in the staying chamber of the dilution vessel and is sucked into the exhaust piping through the hydrogen suction hole while the flow is adjusted by the flow adjustment measure within the staying chamber. In addition, if the hydrogen gas is thus sucked into the exhaust piping, an approximately same amount of the cathode off-gas flows in the staying chamber from the exhaust piping through the off-gas supply hole. At this time, because although the cathode off-gas flowing in the staying chamber tries to diffuse into a whole of the staying chamber, such the flow of the cathode off-gas is suppressed by the flow adjustment measure, the cathode off-gas results in staying in the vicinity of the off-gas supply hole and thereby the cathode off-gas and the hydrogen gas become difficult to mix within the staying chamber. Thus, because the vicinity of the hydrogen suction hole and that of the off-gas supply hole are maintained in a state that a hydrogen concentration and a cathode off-gas concentration is high, respectively, while the hydrogen gas within the staying chamber is all exhausted, a hydrogen gas amount sucked from the hydrogen suction hole becomes constant and thereby it can be made to maintain a hydrogen concentration within the exhaust gas exhausted from the exhaust piping at an adequate concentration.

A second aspect of the present invention is an exhaust gas disposal apparatus of a fuel cell according to the first aspect, wherein at the hydrogen suction hole an ejector is provided for sucking a hydrogen gas within the staying chamber in increments of a predetermined amount, mixing the cathode off-gas with the hydrogen gas, and exhausting them by the cathode off-gas being supplied in increments of a predetermined amount.

In accordance with the second aspect of the present invention, for example, a part of a cathode off-gas flowing in the exhaust piping is supplied to the ejector in increments of the predetermined amount, and thereby the ejector sucks the hydrogen gas within the staying chamber in increments of the predetermined amount, mixes the hydrogen gas with the cathode off-gas inside itself, and exhausts them. And the exhaust gas exhausted from the ejector is further mixed with the cathode off-gas within the exhaust piping and then is exhausted.

A third aspect of the present invention is an exhaust gas disposal apparatus of a fuel cell according to any of the first and second aspects, wherein the off-gas supply hole is provided at a most upstream side of flow adjusted by the flow adjustment measure.

In accordance with the third aspect of the present invention, when a hydrogen gas flowing within the staying chamber is sucked into the hydrogen suction hole of the exhaust piping while the flow of the hydrogen gas is adjusted by the flow adjustment measure, a cathode off-gas is supplied from the off-gas supply hole to the most upstream side of the flow of the hydrogen gas in the staying chamber. In other words, the cathode off-gas flowing in the staying chamber from the exhaust piping results in being supplied to a separate place from the hydrogen suction hole.

A fourth aspect of the present invention is an exhaust gas disposal apparatus of a fuel cell according to any of the first to third aspects, wherein a check valve is provided in an off-gas supply port for allowing inflow of the cathode off-gas from within the exhaust piping into the staying chamber and preventing outflow of a hydrogen gas from within the staying chamber into the exhaust piping, and wherein the off-gas supply port is connected to the off-gas supply hole.

In accordance with the fourth aspect of the present invention, even when a hydrogen gas purged from the fuel cell into the staying chamber tries to flow out of the off-gas supply hole into the exhaust piping, the hydrogen gas is stopped by the check valve. In addition, when because the check valve allows the cathode off-gas to flow out from within the exhaust piping into the staying chamber, a predetermined amount of a hydrogen gas is sucked from the hydrogen suction hole, an amount of a cathode off-gas approximately equal to that of the hydrogen gas results in being supplied form the off-gas supply hole.

BRIEF DESCRIPTION OF THE DRAWINGS

FIG. 3 is an enlarged section drawing showing an exhaust gas disposal apparatus in detail.

FIG. 4A is a graph showing the change over time of the hydrogen concentration of an exhaust gas in a conventional structure without a flow adjustment measure; and FIG. 4B is a graph showing the change over time of the hydrogen concentration of an exhaust gas in a structure of the embodiment.

FIG. 5 is a section drawing showing another embodiment of an exhaust gas disposal apparatus related to the present invention.

DESCRIPTION OF THE PREFERRED EMBODIMENTS

Here will be described embodiments of the present invention in detail, referring to drawings as needed.

Figure 1:
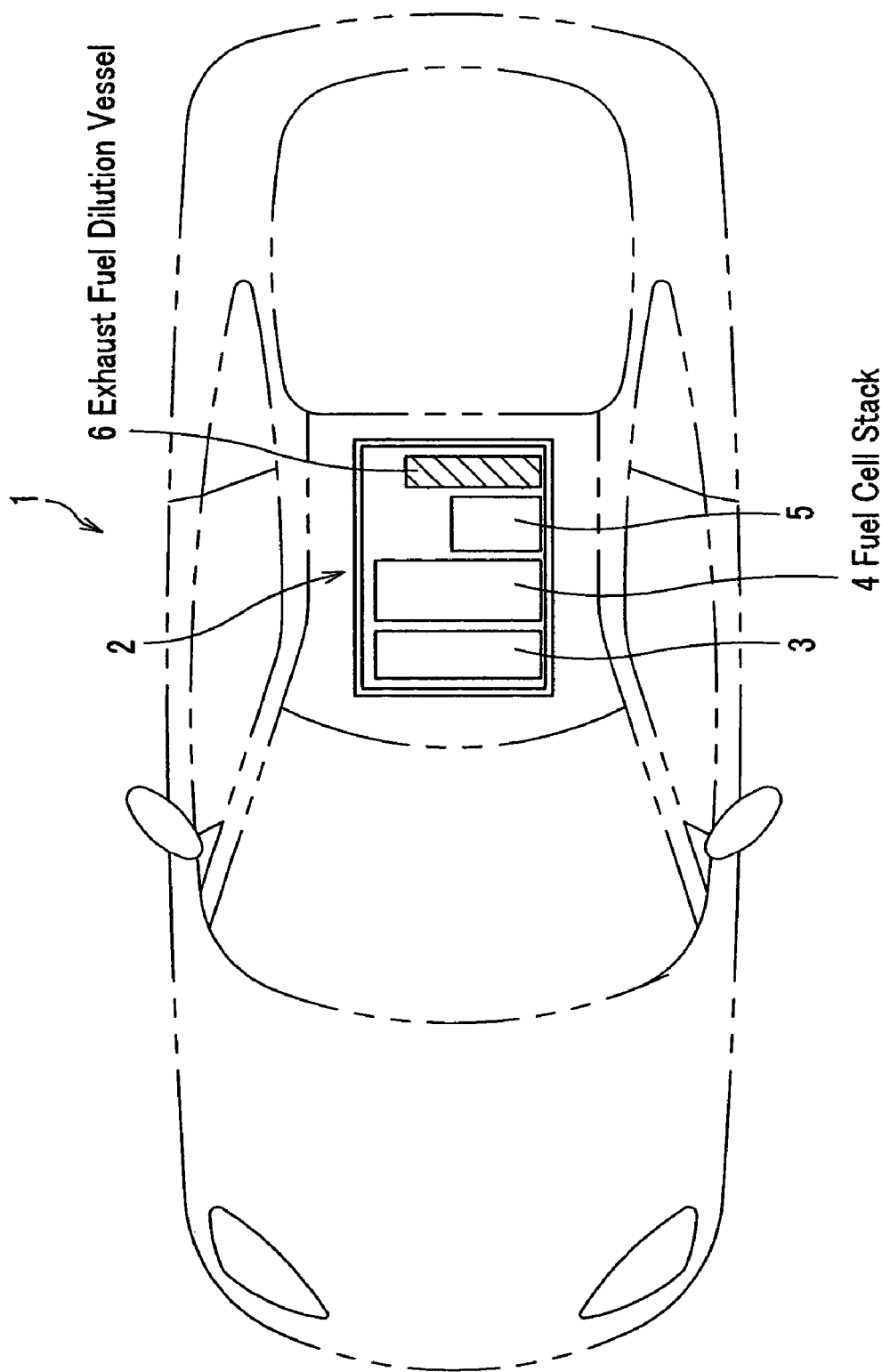
FIG. 1 is a plan view showing a fuel cell automobile comprising an exhaust gas disposal apparatus of a fuel cell related to the present invention.

As shown in FIG. 1, in a fuel cell automobile (hereinafter referred to as 'vehicle') 1 is provided a fuel cell system box 2 under a floor of an approximate center portion. Inside the fuel cell system box 2 are provided a fuel cell system, that is, a thermoregulator 3, a fuel cell stack 4, a humidifier 5, and an exhaust fuel dilution vessel 6 in turn from a front to rear of a vehicle 1. Meanwhile, other than the instruments 3 to 6, the fuel cell system is configured of a radiator (not shown) for cooling the fuel cell stack 4; a high pressure hydrogen container 23, and a compressor (flow variable measure) 21 that can adjust an air amount to be exhausted, shown in FIG. 2; and the like.

Figure 2:
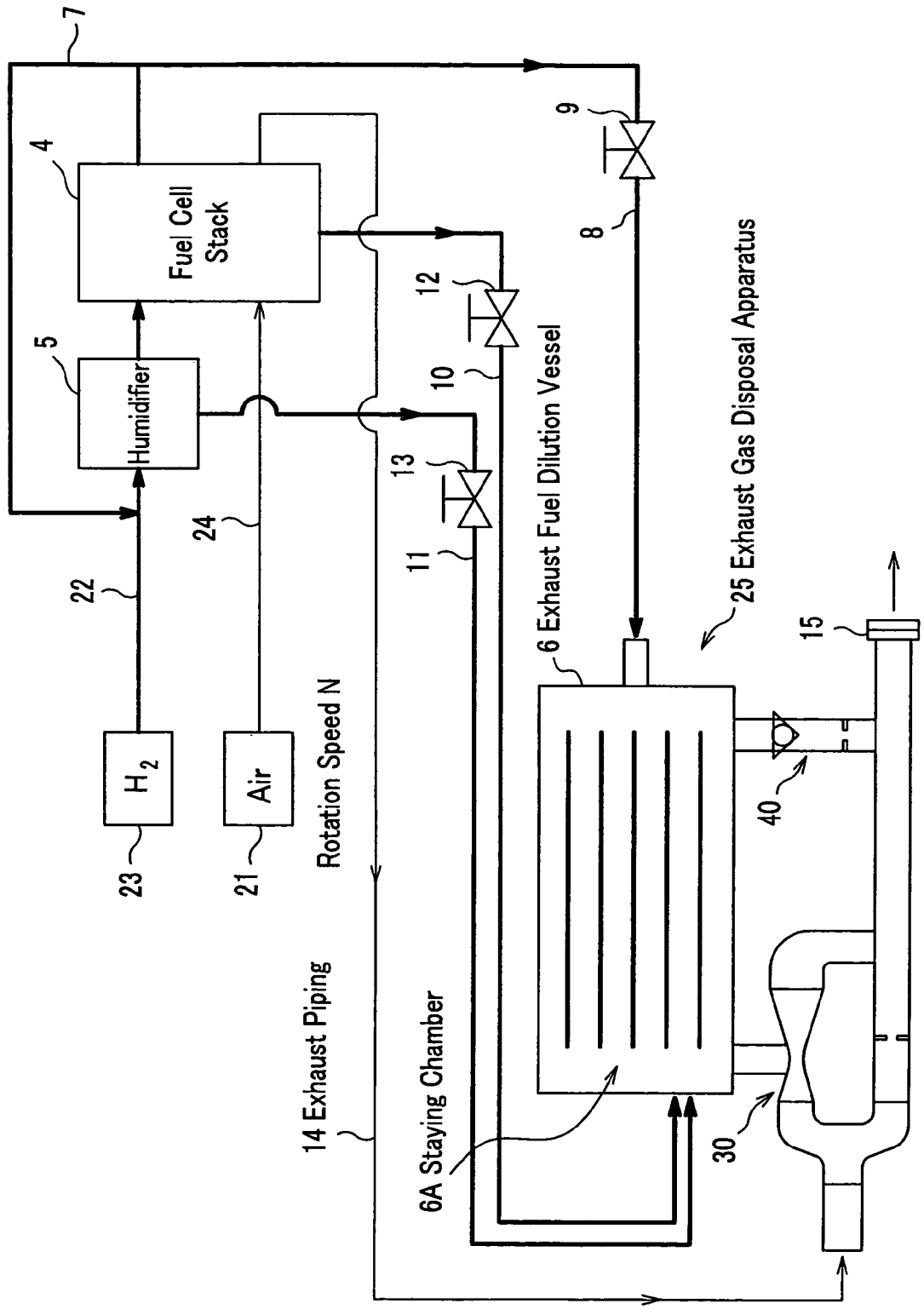
FIG. 2 is an illustration drawing showing a fuel cell system having an exhaust gas disposal apparatus.

As shown in FIG. 2, the fuel cell stack 4 generates electricity by an electrochemical reaction between a hydrogen gas of a fuel gas reserved in the high pressure hydrogen container 23 and air (hereinafter referred to as 'supply air') supplied from the compressor 21. In addition, to a bottom portion of the fuel cell stack 4 is connected anode drain piping 10 for discharging drain such as water produced accompanying the electricity generation into the exhaust fuel dilution vessel 6. Meanwhile, water produced within the fuel cell stack 4 is designed to flow into the exhaust fuel dilution vessel 6 by manually or automatically opening/closing an open/close valve 12 provided at an appropriate place of the anode drain piping 10.

At an anode side of the fuel cell stack 4, to an inlet thereof is connected hydrogen supply piping 22 for leading a hydrogen gas from the high pressure hydrogen container 23 into the fuel cell stack 4; and to an outlet thereof is connected circulation piping 7 for again returning the hydrogen gas to the fuel cell stack 4. And to the circulation piping 7 is connected purge hydrogen piping 8 for exhausting impurities in a hydrogen gas pooling inside of the circulation piping 7 and a hydrogen gas containing the water produced within the fuel cell stack 4. Meanwhile, the hydrogen gas within the circulation piping 7 is designed to be intermittently purged (exhausted) to the exhaust fuel dilution vessel 6 by a purge valve 9, which is provided at an appropriate place of the purge hydrogen piping 8, being appropriately opened/closed by a controller not shown.

At a cathode side of the fuel cell stack 4, to an inlet thereof is connected air supply piping 24 for leading supply air from the compressor 21 into the fuel cell stack 4; and to an outlet thereof is connected exhaust piping 14 for leading air (hereinafter referred to as "exhaust gas (cathode off-gas)") exhausted from the fuel cell stack 4 outside. Meanwhile, the exhaust piping 14 is provided so that a part thereof passes an underside of the exhaust fuel dilution vessel 6, and the part is utilized as an exhaust gas disposal apparatus 25 described later.

The humidifier 5 is provided at an appropriate place of the hydrogen supply piping 22, and to a bottom portion of the humidifier 5 is connected humidifier drain piping 11 for discharging drain such as water to the exhaust fuel dilution vessel 6. Meanwhile, the drain within the humidifier 5 is designed to flow into the exhaust fuel dilution vessel 6 by manually or automatically opening/closing an open/close valve 13 provided at an appropriate place of the humidifier drain piping 11. In addition, although omitting to be shown in a drawing, it is similarly designed that: to the air supply piping 24 are provided the humidifier 5, the humidifier drain piping 11, and the open/close valve 13; and the drain of the humidifier 5 is discharged into the exhaust fuel dilution vessel 6.

Subsequently, it will be described the exhaust gas disposal apparatus 25 related to the embodiment, referring to FIG. 3.

As shown in FIG. 3, the exhaust gas disposal apparatus 25 is mainly configured of the exhaust fuel dilution vessel 6 and the exhaust piping 14.

The exhaust fuel dilution vessel 6 is a vessel of an approximate cuboid having a staying chamber 6A for staying a hydrogen gas purged from the fuel cell stack 4 (see FIG. 2), and at a side wall 61 of one side (right side of FIG. 3) of the vessel 6 is formed a hydrogen introduction hole 61a for introducing the hydrogen gas inside, and to the hydrogen introduction hole 61a is connected the hydrogen purge piping 8. In addition, at one side (right side of FIG. 3) of a bottom wall 62 of the exhaust fuel dilution vessel 6 is formed an air supply hole (off-gas supply hole) 62a for supplying exhaust air into the staying chamber 6A from the exhaust piping 14, and at the other side (left side of FIG. 3) of the bottom wall 62 is formed a hydrogen suction hole 62b for sucking the hydrogen gas within the staying chamber 6A into the exhaust piping 14.

Here the air supply hole 62a is provided so as to be located at a most upstream side of flow of the hydrogen gas flow-adjusted by a flow adjustment measure 63 described later. Thus the exhaust gas supplied into the exhaust fuel dilution vessel 6 from the air supply hole 62a is designed to act so as to push out the hydrogen gas from the side of the air supply hole 62a to the side of the hydrogen suction hole 62b. In addition, the anode drain piping 10 and the humidifier drain piping 11 shown in FIG. 2 are connected to the vicinity of the hydrogen suction hole 62b, and thereby the hydrogen suction hole 62b is designed to be a structure that water discharged from the piping 10 and 11 is sucked into the hydrogen suction hole 62b together with the hydrogen gas.

Furthermore, within the staying chamber 6A of the exhaust fuel dilution vessel 6 is provided the flow adjustment measure 63 for adjusting flow of the hydrogen gas introduced from the hydrogen introduction hole 61a, leading the hydrogen gas into the hydrogen suction hole 62b, and suppressing the diffusion of the exhaust air supplied into the staying chamber 6A from the air supply hole 62a. To be more precise, the flow adjustment measure 63 is configured by a plurality of flat plates 63 being provided approximately at an equal distance in parallel to the top wall 64 and bottom wall 62 of the exhaust fuel dilution vessel 6.

The exhaust piping 14 is mainly configured of first piping 14a, divergence piping 14b, convergence piping 14c, and second piping 14d. One end of the first piping 14a is connected to the fuel cell stack 4; and the other end thereof to the divergence piping 14b.

The divergence piping 14b is pipes formed by a downstream side portion thereof being separated into two: to a first divergence portion D1 of an upper side (one side) of the piping 14b is connected the convergence piping 14c through an ejector 30 described later; and to a second divergence portion D2 of the lower side (the other side) of the piping 14b is connected the second piping 14d. The convergence piping 14c is a pipe approximately formed into an L-letter form: One end thereof is connected to the ejector 30; and the other end thereof to a convergence hole H1 of the second piping 14d.

In the second piping 14d, at an appropriate place of a peripheral wall thereof is formed the convergence hole H1, where the convergence pipe 14c is connected; and at a more downstream side than the convergence hole H1 is formed a supply hole H2 for supplying exhaust gas within the second piping 14d into the staying chamber 6A. Meanwhile, to the supply hole H2 is connected one end of an air supply port 40 described later whose other end is connected to the air supply hole 62a of the exhaust fuel dilution vessel 6.

In addition, within the second piping 14d, at an appropriate place between from an inlet side thereof to the convergence hole H1 is provided a first orifice 50 for adjusting a flow amount Z of an exhaust gas so that a flow amount Y of an exhaust gas directing to the ejector 30 becomes a predetermined amount. In other words, the first orifice 50 determines a ratio of the flow amount Y of the exhaust gas directing to the ejector 30 and the flow amount Z of the exhaust gas going out of the first orifice 50. Furthermore, at an end of an outlet side of the second piping 14d is provided a backfire prevention filter 15.

The ejector 30 is mainly configured of a nozzle 31 for ejecting exhaust air at a high speed by narrowing down flow of the exhaust air; a suction portion 32 for sucking a hydrogen gas, which is made a negative pressure by the exhaust air ejected from the nozzle 31; and a diffuser 33 for mixing the exhaust air with the hydrogen gas and exhausting them. Meanwhile, the suction portion 32 of a most narrowed-down portion of the ejector 30 is connected to the hydrogen suction hole 62b of the exhaust fuel dilution vessel 6 through a tubular hydrogen suction port 70, and thereby the ejector 30 is designed to be a structure of sucking a hydrogen gas within the staying chamber 6A. In addition, a predetermined amount of the exhaust air adjusted by the first orifice 50 is supplied to the nozzle 31, and thereby a predetermined amount of the hydrogen gas is designed to be supplied to the suction portion 32. In other words, the ejector 30 is designed to be a structure of sucking the predetermined amount of the hydrogen gas within the staying chamber 6A at the suction portion 32, mixing the exhaust air with the hydrogen gas through the diffuser 33, and exhausting them by the exhaust air being supplied to the nozzle 31 in increments of the predetermined amount.

Here a relationship between a suction amount X of the ejector 30 and the flow amount Y of the exhaust air supplied to the nozzle 31 is approximately direct proportional; and that of the flow amount Y of the exhaust air supplied to the nozzle 31 and the flow amount Z of the exhaust air going out of the first orifice 50 is also approximately direct proportional like a case that if the Y increases, the Z increases. Furthermore, a relationship between the flow amount Z (then, flow amount Y+flow amount Z) of the exhaust air going out of the first orifice 50 and a rotation speed N of the compressor 21 shown in FIG. 2 is also approximately direct proportional. In other words, a ratio is designed to be always constant, which is the ratio (X:Y:Z:N) of the suction amount X of the ejector 30, the flow amount Y of the exhaust air supplied to the nozzle 31, the flow amount Z of the exhaust air going out of the first orifice 50, and the rotation speed N of the compressor 21. Therefore, in a state of the ejector 30 sucking nothing but the hydrogen gas, a hydrogen concentration of an exhaust gas exhausted form the second piping 14d always becomes approximately constant regardless of increase/decrease of the rotation speed N of the compressor 21.

The air supply port 40 is a pipe for communicating the exhaust fuel dilution vessel 6 and the second piping 14d and comprises a second orifice 41 and a check valve 42 at appropriate places therein. The second orifice 41 has a function of adjusting a flow amount of an exhaust gas supplied into the staying chamber 6A of the exhaust fuel dilution vessel 6 from the second piping 14d so that the flow amount of the exhaust gas becomes a predetermined amount. The check valve 42 has a function of allowing inflow of the exhaust air into the staying chamber 6A of the exhaust fuel dilution vessel 6 from the second piping 14d and preventing outflow of a hydrogen gas into the second piping 14d from the staying chamber 6A of the exhaust fuel dilution vessel 6.

Meanwhile, for example, a lead valve and the like can be adopted as the check valve 42. In addition, the check valve 42 and the ejector 30 are designed to be structures of condensed water not pooling so that the water does not freeze therein. To be more precise, because the suction portion 32 of the ejector 30 is narrowed down and a shape of the ejector 30 (shape of a part of the lower wall heaving upward and gradually becoming a going-down inclination as it goes to both sides) is designed to gradually become larger in diameter as it goes from the suction portion 32 to both ends of the ejector 30, the ejector 30 becomes a structure that can discharge water sucked together with a hydrogen gas to both sides thereof.

Next will be described an action of the exhaust gas disposal apparatus 25, referring to FIGS. 2 and 3.

As shown in FIG. 2, when a hydrogen gas is purged from the fuel cell stack 4, the hydrogen gas flows in the staying chamber 6A of the exhaust fuel dilution vessel 6 through the purge hydrogen piping 8. The hydrogen gas thus flowing in the staying chamber 6A is, as shown in FIG. 3, sucked into the ejector 30 in increments of a predetermined amount through the hydrogen suction hole 62b while being flow-adjusted by the flow adjustment measure 63. In addition, when the hydrogen gas is thus sucked into the ejector 30, an amount of exhaust air, which is approximately equal to that of the hydrogen gas sucked into the ejector 30, flows in the staying chamber 6A from the second piping 14d through the air supply port 40.

At this time, because although the exhaust air flowing in the staying chamber 6A tries to diffuse into a whole thereof, such flow of the exhaust air is suppressed by the flow adjustment measure 63, thus the exhaust air results in staying in the vicinity of the air supply hole 62a, and the exhaust air and the hydrogen gas become difficult to mix within the staying chamber 6A. Thus while the hydrogen gas within the staying chamber 6A is all exhausted, the vicinity of the hydrogen suction hole 62b results in being maintained in a state of a concentration of the hydrogen gas being high; and the vicinity of the air supply hole 62a results in being maintained in a state of a concentration of the exhaust air being high.

Thus the concentration of the hydrogen gas in the vicinity of the hydrogen suction hole 62b results is maintained in the high state; and thereby a hydrogen gas with which the exhaust air rarely mixes is sucked in increments of a predetermined amount, is mixed with a predetermined amount of the exhaust air within the ejector 30, and the mixture gas becomes a predetermined hydrogen concentration and is exhausted into the convergence piping 14c. And a mixture gas exhausted into the second piping 14d through the convergence piping 14c is further diluted by a predetermined amount of an exhaust air adjusted by the first orifice 50, and thereby a hydrogen concentration of an exhaust gas exhausted from the second piping 14d results in being maintained in an appropriate concentration.

Next will be described a change over time of a hydrogen concentration of an exhaust gas in the embodiment, comparing with that of a conventional one, with referring to FIGS. 4A and 4B.

Figure 4A:
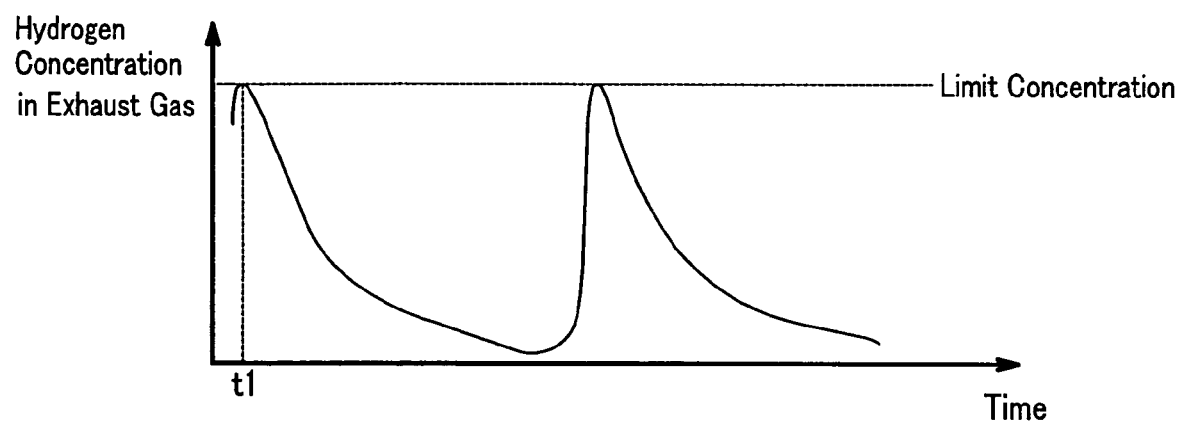
FIGS. 4A and 4B are graphs showing a change-over time of a hydrogen concentration.

As shown in FIG. 4A, in a conventional structure, although when purging a hydrogen gas (t1), a hydrogen concentration of an exhaust gas approximately becomes a limit concentration (concentration calculated by considering a predetermined safety ratio out of an upper limit of a hydrogen concentration that can be exhausted outside), then the hydrogen concentration gradually lowers, and therefore, it takes time before exhausting all hydrogen gas into a dilution vessel.

Figure 4B:
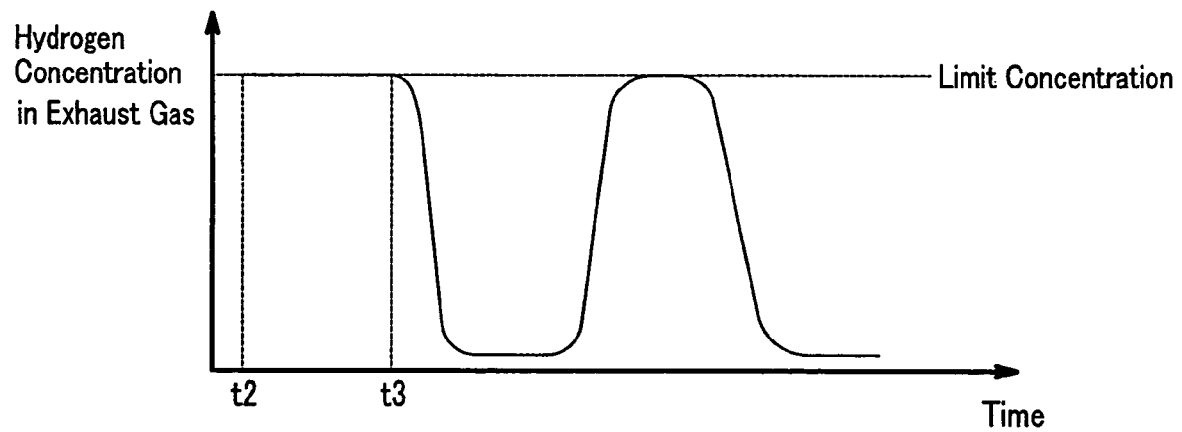

On the other hand, as shown in FIG. 4B, in the structure of the embodiment the hydrogen concentration of the exhaust gas is maintained approximately at the limit concentration from a time of purging a hydrogen gas (t2) to a predetermined time (t3) and becomes a value near zero at once. That is, as shown in FIG. 3, while the hydrogen gas remains within the staying chamber 6A, the hydrogen concentration of the exhaust gas going out of the second piping 14d is maintained approximately at the limit concentration; and when the hydrogen gas runs out within the staying chamber 6A, the hydrogen concentration of the exhaust gas approximately becomes zero. Therefore, the structure of the embodiment enables the hydrogen gas within the exhaust fuel dilution vessel 6 to be all exhausted outside in a time shorter than the conventional structure and can sufficiently draw out a capacity of the dilution vessel 6.

Thus, although one of the embodiments of the present invention is described, the invention is not limited thereto and is practiced in various modes:

(i) Although in the embodiment the air supply hole 62a is located at the most upstream side of a hydrogen gas by providing the air supply hole 62a at one end of the flow adjustment measure 63 extending to left/right and the hydrogen suction hole 62b at the other end, the present invention is not limited thereto. For example, as shown in FIG. 5, the air supply hole 62a may be located at the most upstream side of the hydrogen gas by making such a structure of adjacently providing the air supply hole 62a and the hydrogen suction hole 62b and connecting them with one passage 65 formed within the staying chamber 6A so that the air supply hole 62a and the hydrogen suction hole 62b bends a plurality of times. Meanwhile, the passage 65 can be formed by appropriately bending and at an appropriate place providing each flat plate 63a of the flow adjustment measure 63, and doing the like in the embodiment.

In addition, in a structure of FIG. 5, same as in the embodiment, it is desirable to provide the check valve 42 at the side of the air supply hole 62a and to prevent backflow of a hydrogen gas from the exhaust fuel dilution vessel 6 into the exhaust piping 14. Furthermore, it goes without saying that the divergence pipe 14b, the ejector 30, the first orifice 50, the second orifice 41, and the like in the embodiment may be appropriately adopted.

(ii) Although in the embodiment the flow adjustment measure 63 is configured of a plurality of the flat plates 63a, the present invention is not limited thereto, and for example, the flow adjustment measure 63 may be configured of a honeycomb structure and a plurality of hollow pipes. Furthermore, the exhaust fuel dilution vessel 6 may be made to have a function of the flow adjustment measure 63 by forming the vessel 6 into an elongate pipe form. To be more precise, it is available to provide a hydrogen introduction hole for introducing a hydrogen gas, which is purged from a fuel cell, inside; an air supply hole for supplying exhaust air inside, at one end of the exhaust fuel dilution vessel of the elongate pipe form; and a hydrogen suction hole for making exhaust piping suck the hydrogen gas at the other end.

(iii) Although in the embodiment a predetermined amount of a hydrogen gas is designed to be sucked into the exhaust piping 14 by the ejector 30, the present invention is not limited thereto. For example, it is also available that the predetermined amount of the hydrogen gas is designed to be sucked into or sent out into the exhaust piping 14 by any of mechanical and electrical fans.

(iv) Although in the embodiment both of the air supply hole 62a and the hydrogen suction hole 62b are formed at the bottom portion of the exhaust fuel dilution vessel 6, the present invention is not limited thereto: For example, the hydrogen suction hole 62b may be formed at the top portion of the exhaust fuel dilution vessel 6; and the air supply hole 62a may be formed at the bottom portion of the exhaust fuel dilution vessel 6. In accordance with this structure, because a hydrogen gas is lighter than exhaust air, the hydrogen gas and the exhaust air become more difficult to mix, and thus a hydrogen concentration in the vicinity of the hydrogen suction hole 62b can be maintained high.

(v) Although in the embodiment the air supply hole 62a and the hydrogen suction hole 62b are provided, the present invention is not limited thereto: For example, in a structure that the exhaust piping 14 penetrates the exhaust fuel dilution vessel 6 and is provided at it, it is available to provide a hydrogen suction hole and an air supply hole at a part of the exhaust piping 14 (portion located within the exhaust fuel dilution vessel 6) and to appropriately set a flow adjustment measure matching these.

(vi) Although in the embodiment the supply hole H2 is provided at the downstream side of the convergence hole H1, the present invention is not limited thereto: It may be designed that the supply hole H2 is provided at the upstream side of the convergence hole H1, and the air supply port 40 is connected to the supply hole H2. Thus, because nothing but pure exhaust air with which a hydrogen gas does not mix can be supplied into the exhaust fuel dilution vessel 6, it can be made to speedily lower a hydrogen concentration within the exhaust fuel dilution vessel 6 and to prepare for a next purge.

What is claimed is:

1. An exhaust gas disposal apparatus of a fuel cell, the apparatus comprising:

a dilution vessel having a staying chamber configured for accommodating a hydrogen gas purged from said fuel cell; and exhaust piping for passing a cathode off-gas, wherein any of said dilution vessel and said exhaust piping comprises a hydrogen suction hole for sucking the hydrogen gas within said staying chamber, wherein a flow adjustment measure configured for flow-adjusting said hydrogen gas, and leading the hydrogen gas into said hydrogen suction hole is provided within said staying chamber, wherein said exhaust piping includes a divergence portion diverged into first piping and second piping, and wherein an ejector is arranged in said first piping, the ejector comprising:
- a nozzle configured to eject said cathode off-gas at a high speed by focusing flow of said cathode off-gas;
- a suction portion configured to generate a negative pressure by the cathode off-gas ejected from the nozzle, and to suck said hydrogen gas within said staying chamber: and
- a diffuser configured to mix said cathode off-gas with said hydrogen gas into a mixture gas at a location downstream of said suction portion and to exhaust the mixture gas,
- wherein at a location upstream of said ejector is arranged said divergence portion, and at a location downstream of the ejector is arranged a convergence portion where the mixture gas passing through the ejector and the cathode off-gas flowing in said second piping converge.

2. An exhaust gas disposal apparatus of a fuel cell according to claim 1, wherein said ejector sucks said hydrogen gas within said staying chamber in increments of a predetermined amount.

3. An exhaust gas disposal apparatus of a fuel cell according to claim 1, wherein any of said dilution vessel and said exhaust piping comprises an off-gas supply hole for supplying the cathode off-gas within said exhaust piping into said dilution vessel and said off-gas supply hole is configured to be provided at a most upstream side of flow adjusted by said flow adjustment measure.

4. An exhaust gas disposal apparatus of a fuel cell according to claim 1, wherein a check valve is provided in an off-gas supply port for allowing inflow of said cathode off-gas from within said exhaust piping into said staying chamber and preventing outflow of a hydrogen gas from within said staying chamber into said exhaust piping, and wherein said off-gas supply port is connected to said off-gas supply hole.

5. An exhaust gas disposal apparatus of a fuel cell according to claim 3, wherein a check valve is provided in an off-gas supply port for allowing inflow of said cathode off-gas from within said exhaust piping into said staying chamber and preventing outflow of a hydrogen gas from within said staying chamber into said exhaust piping, and wherein said off-gas supply port is connected to said off-gas supply hole.

6. An exhaust gas disposal apparatus of a fuel cell according to claim 1, wherein said ejector becomes larger in diameter thereof as the ejector goes to both ends thereof from a suction portion.

7. An exhaust gas disposal apparatus of a fuel cell according to claim 3, wherein in said exhaust piping said off-gas supply hole is arranged at a more upstream side than said hydrogen suction hole.

8. An exhaust gas disposal apparatus of a fuel cell according to claim 1, wherein the exhaust piping includes a second divergence portion, downstream of the convergence portion, diverging into a third piping and a fourth piping, wherein:
- a combination of the mixture gas passing through the ejector and the cathode off-gas form an exhaust mixture at the convergence portion,
- the third piping introduces the exhaust mixture to the dilution vessel, and
- the fourth piping exhausts the exhaust mixture from the exhaust gas disposal apparatus of the fuel cell.

9. An exhaust gas disposal apparatus of a fuel cell according to claim 8, wherein the third piping communicates with the dilution vessel via an air supply hole separate and distinct from the hydrogen suction hole, wherein the air supply hole introduces the exhaust mixture to the dilution vessel.

10. An exhaust gas disposal apparatus of a fuel cell according to claim 8, further comprising a first orifice having a diameter smaller than a diameter of the second piping, the first orifice provided in the second piping between the divergence portion and the convergence portion, the first orifice adjusting an amount of the cathode off-gas flowing toward the ejector.

11. An exhaust gas disposal apparatus of a fuel cell according to claim 10, further comprising a second orifice having a diameter smaller than a diameter of the third piping, provided in the third piping to adjust an amount of the exhaust mixture introduced into the dilution vessel.

* * * * *